Aug. 28, 1934.  H. F. FLOWERS  1,972,042
DUMP VEHICLE
Original Filed Nov. 4, 1925  8 Sheets-Sheet 3
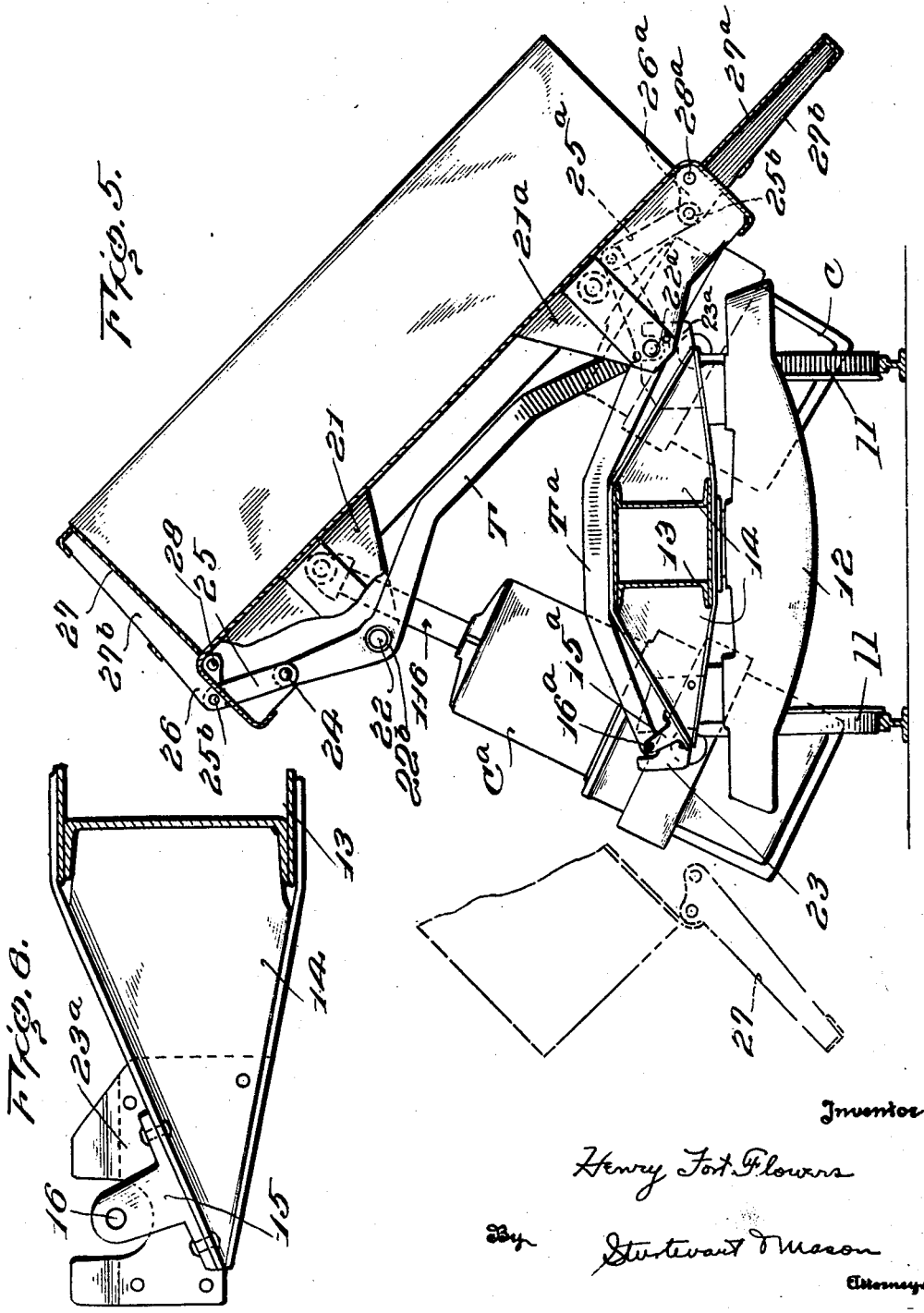
Inventor
Henry Fort Flowers
By Sturtevant & Mason
Attorneys Aug. 28, 1934.   H. F. FLOWERS   1,972,042
DUMP VEHICLE
Original Filed Nov. 4, 1925   8 Sheets-Sheet 4
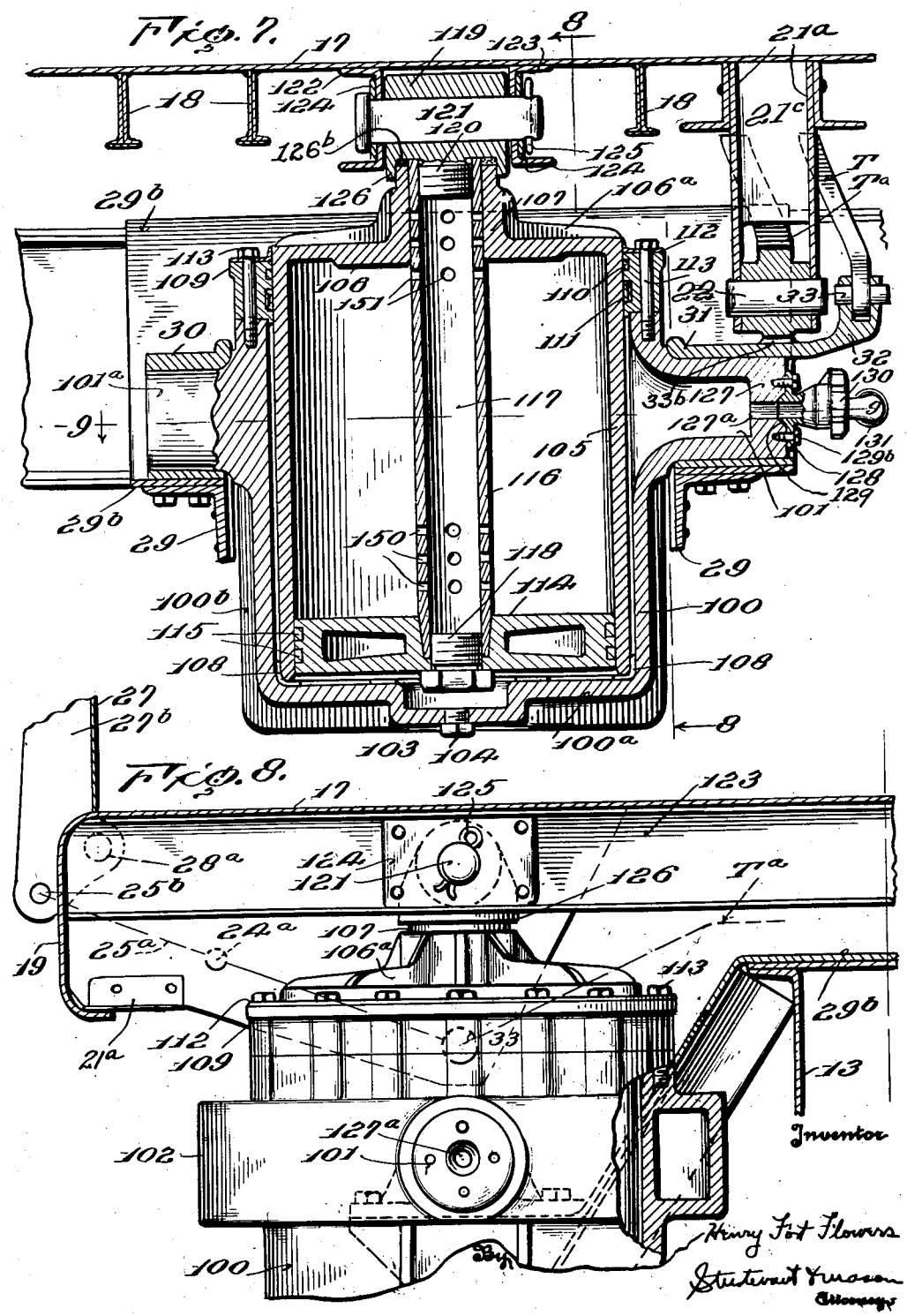

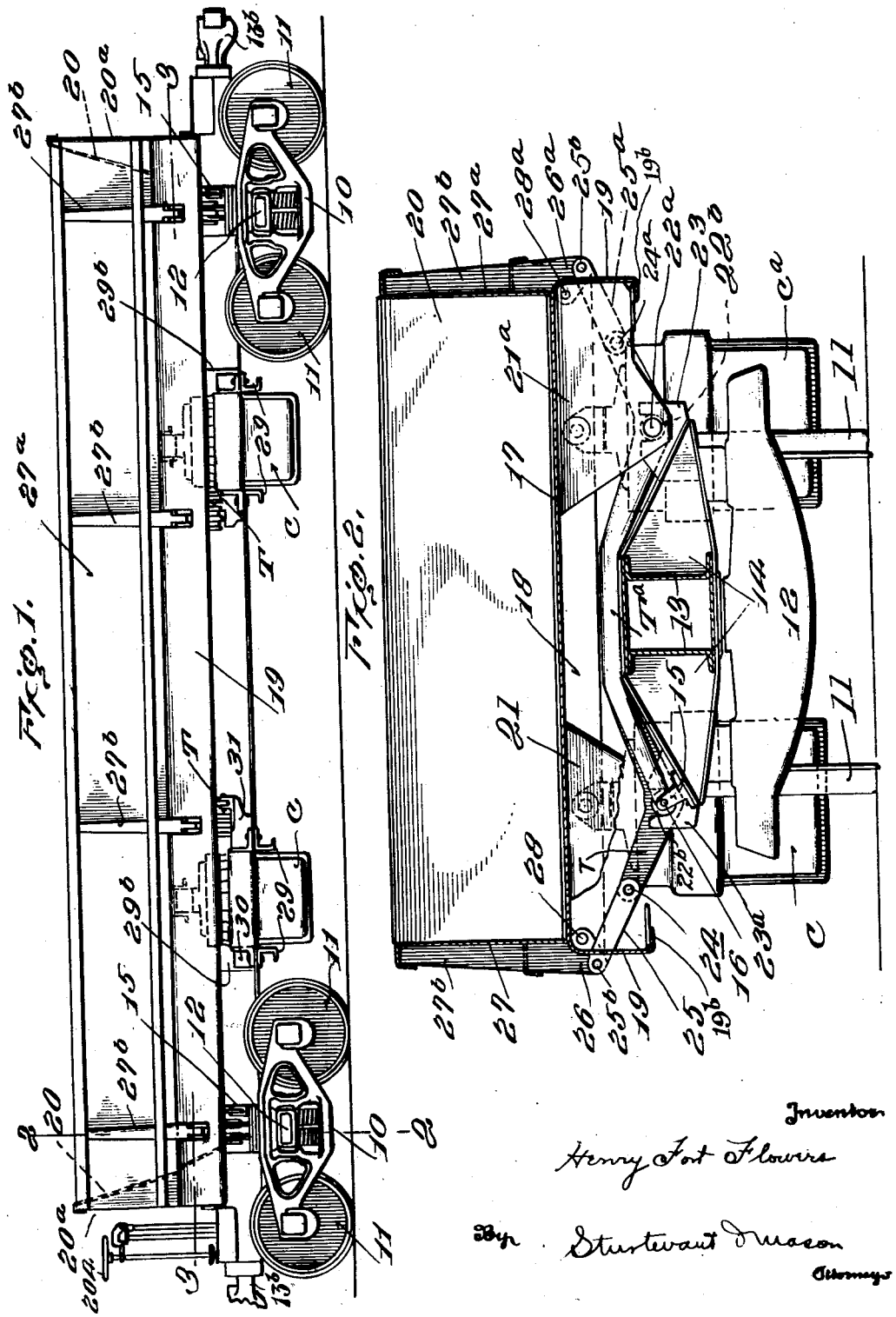

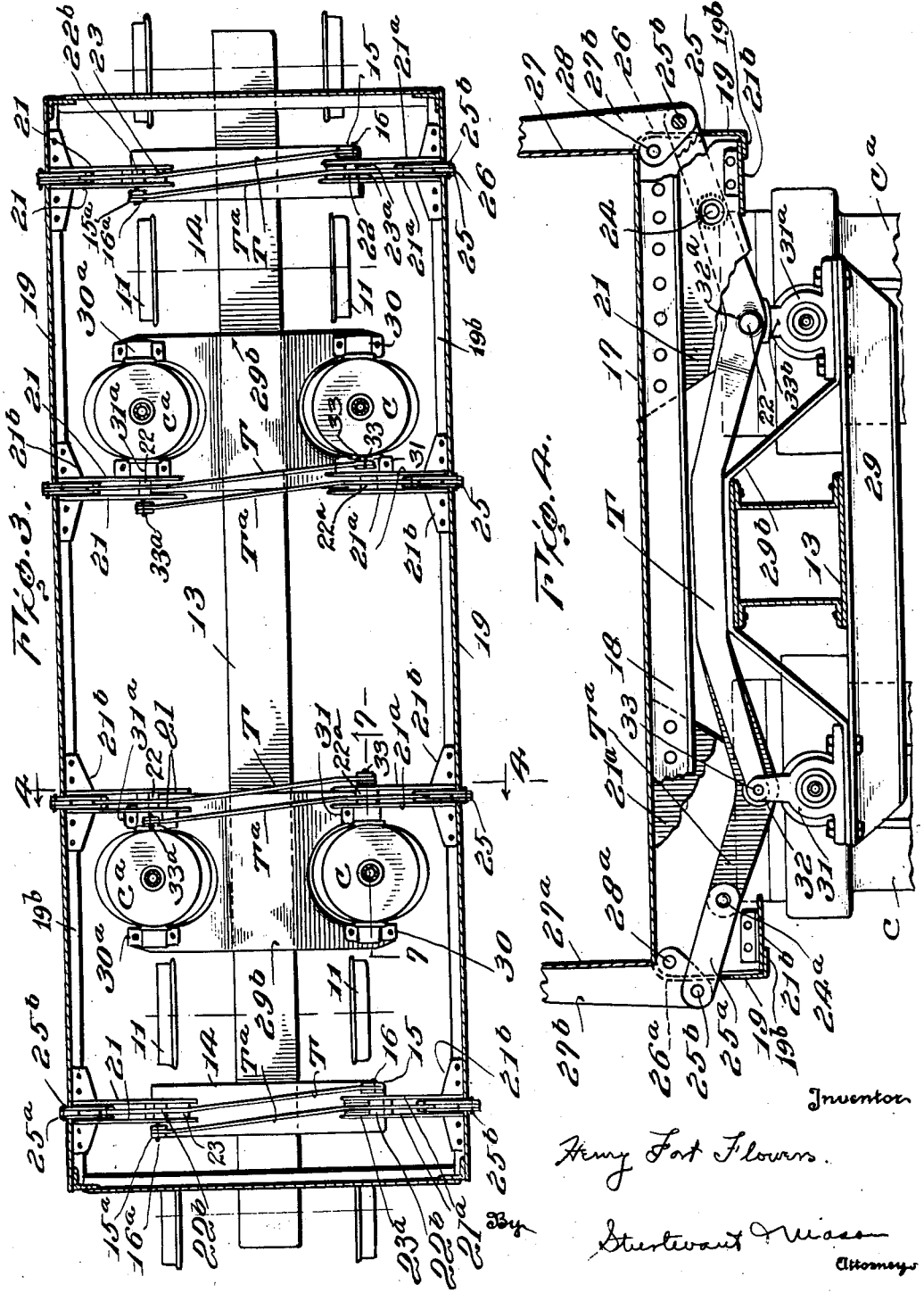

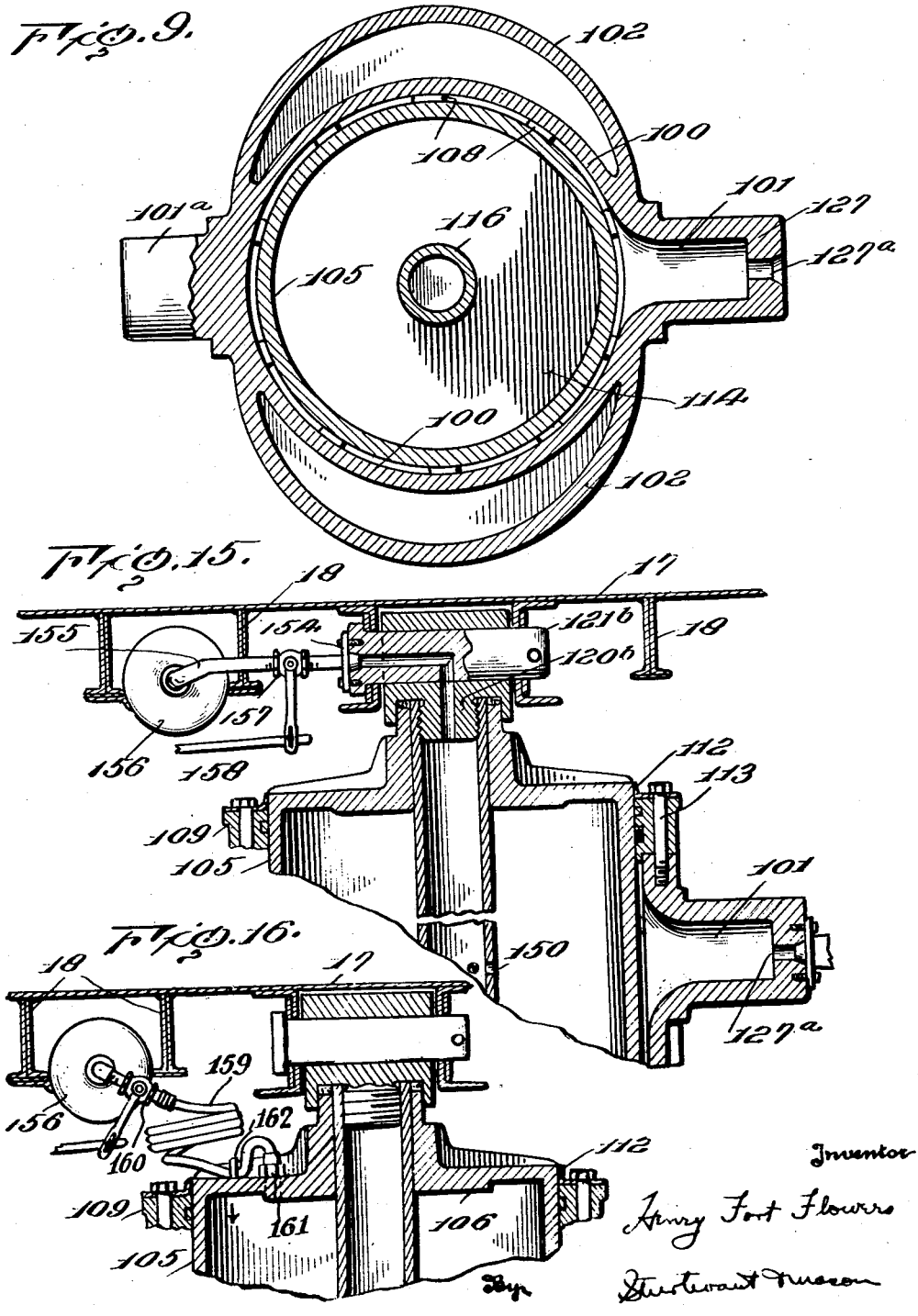

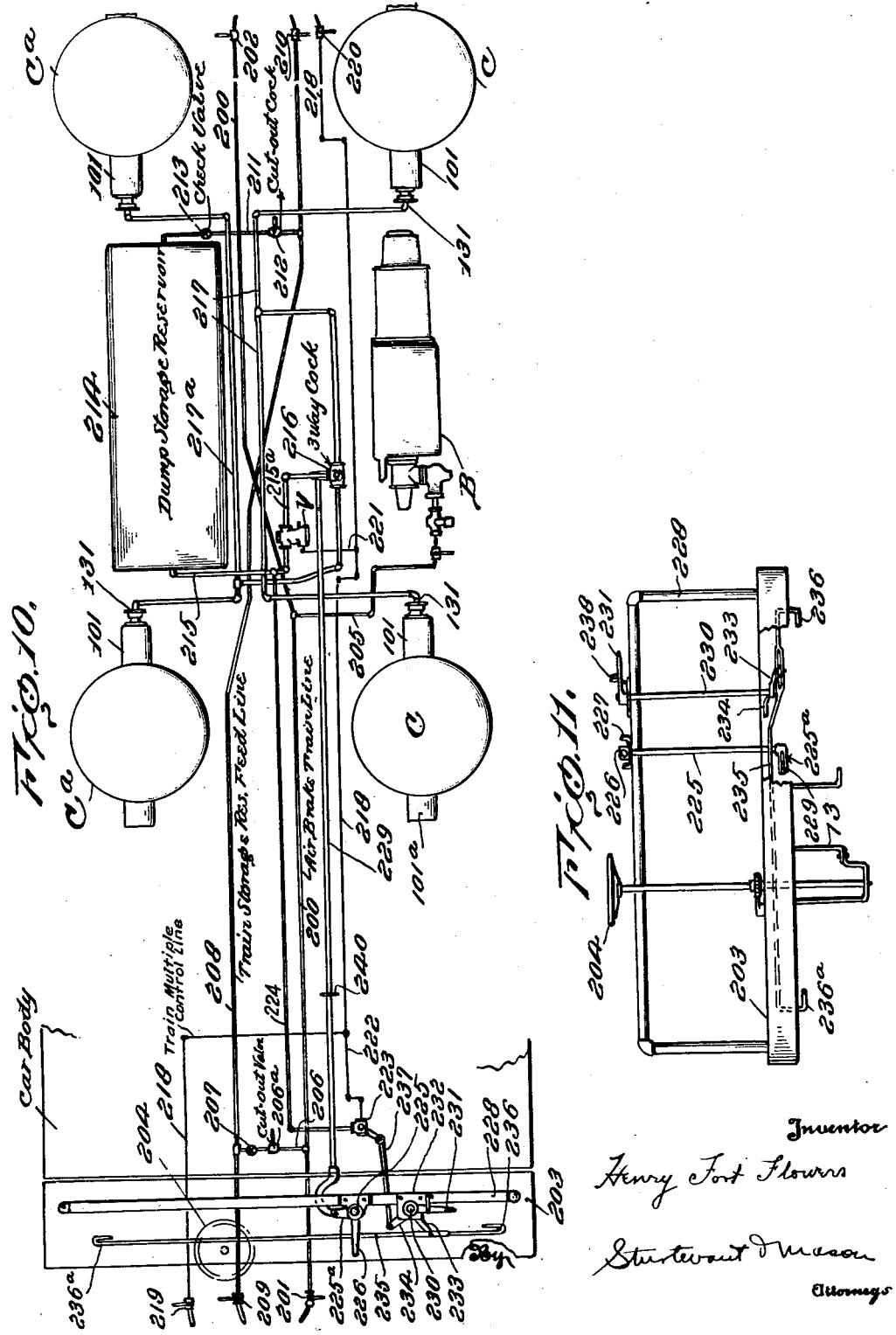

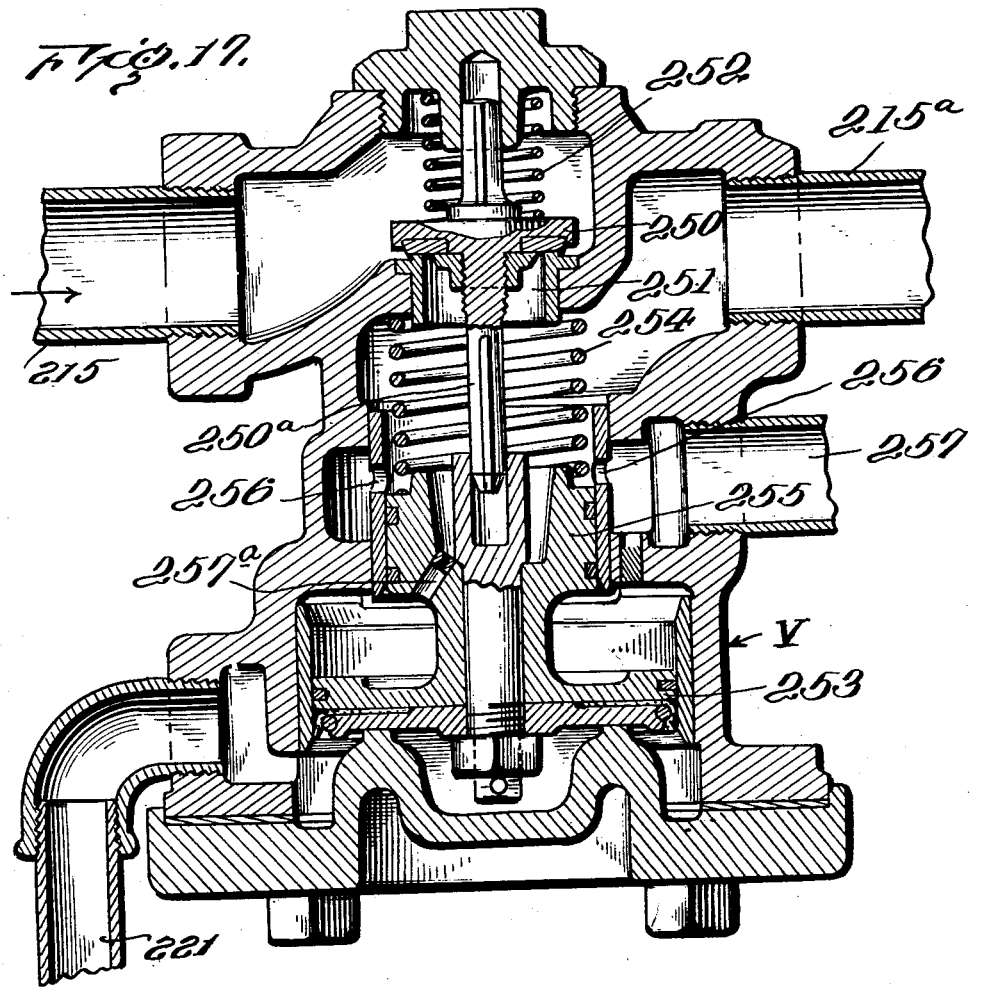
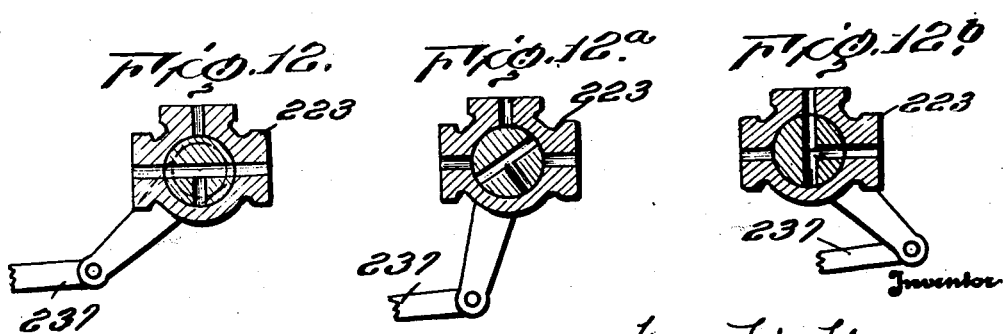

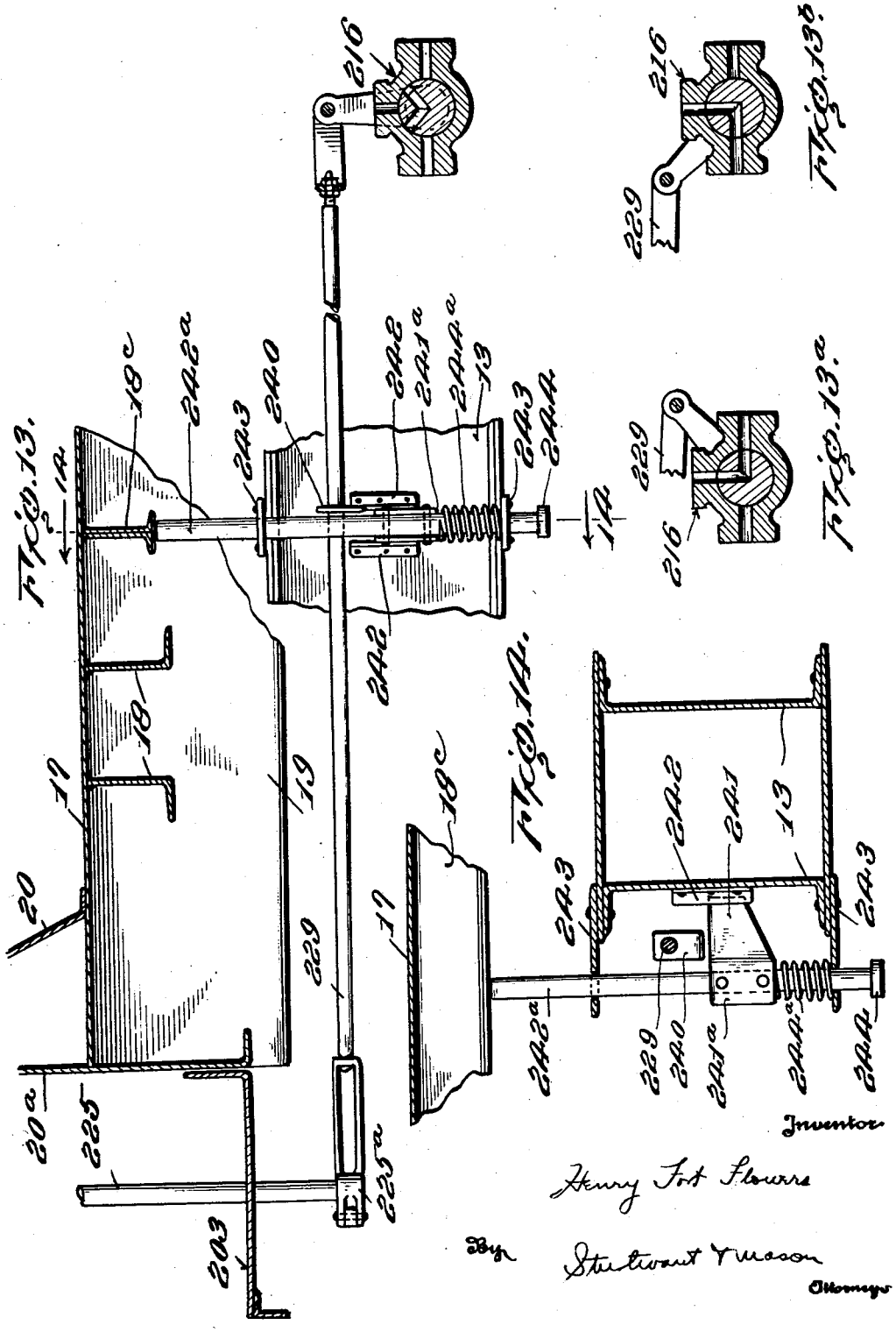

Patented Aug. 28, 1934

1,972,042

UNITED STATES PATENT OFFICE 1,972,042

DUMP VEHICLE

Henry Fort Flowers, Findlay, Ohio

Application November 4, 1925, Serial No. 66,791
Renewed February 15, 1934

42 Claims. (Cl. 105—273)

This invention relates to improvements in the construction of dump vehicles for road and rail use, and more particularly concerns the assembly and operation of such vehicles.

Certain features of this present application are in the nature of improvements upon my pending application Serial Number 740,307, filed September 27, 1924, now Patent No. 1,611,012, granted Dec. 14, 1926; and reference is made thereto.

One of the objects of the present invention is to provide a new and improved construction for the dump body of such vehicles, by which the body is strengthened and braced, and by which the body may for the same load be made much lighter than heretofore.

Another object of the invention is to provide a mounting for the body whereby said body may be directly supported by fulcrum supports on the underframe which are widely spaced so as to prevent said body from accidentally dumping during transport.

Another object of the invention is to provide a body mounted in the above manner with downfolding side doors and with means for automatically, independently and selectively controlling said doors.

Another object is to provide a power system for tilting the body to dump the load therefrom, which embodies means for coupling this power system to a fluid pressure supply system on the power plant furnishing motive power to the vehicle.

A further object is to provide means for gently and gradually checking and controlling the operation of the power units which determine the tilting.

A further object is a new and improved construction and arrangement of such power units by which they may be made of large size and power, and are easily connected to the fluid pressure delivering system.

Another object is to provide an underframe assembly which rigidly sustains the power unit journals or trunnions, and to which the dump body is connected in such manner that the body may tilt to either side according to the actuation of these power units, and in particular in such manner that the torsion load upon the framework beam is reduced, whereby the said underframe may be made lighter than heretofore for a body of given load capacity.

Another object is to provide a piping system for the fluid pressure medium by which one or more cars may be operated at the same time, to either side as may be selected; and to such tilting angle as the operator may desire; and by which one or more cars may be cut out of the multiple unit control, or the fluid pressure medium may be delivered to the control system at any car from the air brake line passing through that car or from the locomotive by a separate pipe line direct, as the operator may desire.

These and other objects of this invention will appear in the course of the following specification and claims, and are set forth in one general form of execution on the accompanying drawings, in which the structure and assembly is shown as applied to a railway tilting dump car having two sets of power units capable of tilting the body to either side, and furnished with fluid medium under pressure from the air pumps mounted upon the locomotive which is attached to a train of such cars.

In the drawings,

Fig. 1 is a side elevation of such a dump car.

Fig. 2 is a transverse section on line 2—2 of Fig. 1.

Fig. 3 is a horizontal section on an enlarged scale substantially on line 3—3 of Fig. 1, passing immediately beneath the floor beams for greater clearness.

Fig. 4 is a transverse section on line 4—4 of Fig. 3 and a larger scale than Fig. 2.

Fig. 5 is a view corresponding to Fig. 2, but in the dumping or tilted position.

Fig. 6 is a detail of the cross-member on a larger scale than in Fig. 5 and with the associated elements removed for greater clearness.

Fig. 7 is a vertical section through the axis of one of the power units and its trunnions.

Fig. 8 is a fragmentary side elevation substantially on line 8—8 of Fig. 7 of the power unit, showing the supporting straddle plate in section, and with a portion of the side of the unit cylinder broken away.

Fig. 9 is a section on line 9—9 of Fig. 7.

Fig. 10 is a diagrammatic plan showing the arrangement of the fluid medium piping system and the control valves.

Fig. 11 is an end view of the car with its control deck, with parts broken away.

Figs. 12, 12ª, 12ᵇ show the various operative positions of the multiple unit control valve.

Fig. 13 is a longitudinal fragmentary section of the car floor and deck, showing the automatic interlock for the dumping control valve.

Figs. 13ª and 13ᵇ show the other positions of the valve.

Fig. 14 is a section substantially on line 14—14 of Fig. 13.

Fig. 15 is a section corresponding to Fig. 7, but showing a modified form of movement checking device.

Fig. 16 is a section similar to Fig. 15 of another modified form of the same.

Fig. 17 is a section of the automatic valve.

The invention relates to a dump vehicle for road and rail use. As shown in the drawings, it is equipped with trucks for rail use. There are two pairs of trucks shown, one at each end of the body of the vehicle, and these trucks are indicated as a whole by the numeral 10. Each truck is provided with wheels 11, and with a supporting bolster 12. The center beam or center sill of the underframe structure is indicated at 13, and as shown is a built-up box girder extending from one end of the car to the other, and having car couplings $13^b$ connected thereto. Rigidly supported by the beam or center sill are laterally extending members 14 forming the frame bolsters. These laterally extending members or bolsters 14 are located at the trucks and are disposed above the truck bolsters. The trucks are pivoted to the center sill in the usual manner. Mounted on these frame bolsters are bearing brackets or fulcrum supports 15 and $15^a$. These bearing brackets or fulcrums are widely spaced and serve as a supporting means for the car body and on which said car body may be selectively tilted for dumping at one side or the other. There are transverse bars or links T and $T^a$ which perform the double function of attaching the body to the underframe and of controlling the doors, as will be hereinafter more fully disclosed. These bars or links are, respectively, pivoted at 16 and $16^a$ to the brackets 15 and $15^a$.

Attached to the under side of the center sill or beam are transverse beams 29. These transverse beams are located intermediate the trucks and are arranged in pairs. Associated with each pair of transverse beams 29 is a plate $29^b$ which extends over the center sill or beam, and is secured to these beams 29, and these plates may, therefore, be referred to as straddle plates. The beams are spaced and the plate is cut away so as to receive the power units which are mounted thereon.

The body of the car includes a bottom sheet 17 which is bent at the sides to form substantially vertical portions 19, 19 with inwardly extending flanges at the lower edges thereof. The floor is stiffened transversely by a number of T-beams 18 which are welded to the bottom of the floor and the vertical portions 19. The ends of the body are formed by sloping aprons 20 which are connected by countersunk rivets to the car floor at the bottom edge thereof, and at the top are formed integral with or welded to the vertical end sheets $20^a$. These vertical end sheets extend downward and are in turn connected to the car floor. This forms a very light and rigid assembly for the body which is particularly adapted for carrying purposes.

Riveted and welded to the transverse stiffening beams 18 of the floor 17 are a number of gusset plates 21, $21^a$ which extend perpendicularly downwardly from the respective sides of the car floor 17. These plates are arranged in pairs. There is a pair of plates 23 at the end of each frame bolster 14, and a pair of plates $23^a$ at the opposite ends of these bolsters. There is also a pair of gusset plates 21 adjacent one end of the straddle plates $29^b$ and a pair of gusset plates $21^a$ adjacent the other end of the straddle plates. To strengthen the frame longitudinally at these points, straps $21^b$ are welded to the vertical portions 19 of the frame, and these straps are secured by suitable means to the gusset plates, as shown in Figures 3 and 4. The pairs of gusset plates may be further stiffened with regard to each other by braces $21^c$ as shown in Fig. 7. This is for the purpose of preventing buckling or collapsing of the gusset plates.

The bar or link T associated with the underframe bolsters at the trucks extends between the gusset plates 21 and is secured thereto by a pivot bolt 22. The bar or link $T^a$ associated with this bolster also extends between the gussett plates $21^a$ and is secured thereto by a pivot bolt $22^a$. Surrounding the pivot bolts 22 and $22^a$ are collars $22^b$. These pivot bolts 22 are in alinement with the pivots 16 at one side of the body, while the pivot bolts $22^a$ are in alinement with the pivots $16^a$ at the other side of the car body. This secures the body to the underframe at all times and permits said body to be tilted to one side or the other without disturbing the connections of the body and the underframe to the links or bars T and $T^a$. These links or bars also serve to control the doors which will be described in detail later. Links or bars of this character connecting the body to the underframe and controlling the doors are shown, described and claimed in my prior Patent No. 1,611,012.

For the purpose of supporting the weight of the car body on these bolsters 14, each bolster carries a bracket or fulcrum support 23, $23^a$, as shown in Figures 2 and 6. The bracket or fulcrum support 23 is so disposed on the bolster as to pass between the gusset plates 21, 21 and receive the collar $22^b$ which surrounds said pivot bolt. Thus it is that the load of the body carried by the gusset plates 21 at one side thereof will, through these pivot bolts and the surrounding collars, be supported on the fulcrum support 23. At the other side, the bracket or fulcrum support $23^a$ receives the collar $22^b$ surrounding the pivot bolt $22^a$. This provides widely spaced fulcrum supports on the underframe bolsters in the region of the trucks on which the body is supported during transport, and on which the body may be tilted to one side or the other selectively for dumping. Each transverse link at the underframe bolster 14 has a link 25 pivoted to the outer end thereof, which link is connected to the bar T by a pivot bolt 22. The link 25 is also pivotally connected to a depending arm or bracket 26 carried by the door 27. Said door 27 is pivoted at 28 to the body of the car. The door has a channel iron $27^b$ rigidly secured thereto which extends downwardly and forms the depending bracket 26 to which the link is connected. The link is connected to this depending bracket by a pivot bolt $25^b$. At the other side of the car there is a door $27^a$ having a channel iron $27^b$ rigidly secured thereto, and this channel iron forms a depending bracket or arm $26^a$ which is pivoted at $28^a$ to the underframe, thus forming a pivot support for the door $27^a$. The depending bracket arm $26^a$ is pivoted at $25^b$ to a link $25^a$ which in turn is pivoted at $24^a$ to the transverse bar or link $T^a$. When the body is tilted to the position shown in Fig. 5, the door at the lower side is automatically opened and swung downward to a full open position substantially parallel with the car floor, and the opening and closing of the door is controlled by the cross bars or links T through their connection with the depending brackets carried by the door 27. The link or cross bar T not only controls the opening and closing of the door at the dumping side, but it remains in a fixed position relative to the body when the body is raised at the side opposite dumping, and maintains the door closed. The link T$^a$ serves in a similar manner to control the door 27$^a$, and in Fig. 5 of the drawings, is shown as holding the door at the elevated side closed. At this time, the link or bar T is stationary relative to the underframe, and is controlling the door at the dumping side. During transport, these cross bars or links T and T$^a$ through their connection to the doors serve to hold the doors closed. The door cannot open unless the body is given a tilting movement relative to the underframe, and therefore, the weight of the body through these transverse bars or links, will serve to hold the doors closed during transport, as said weight of the body maintains the body on its fulcrum supports.

There are also transverse bars or links T and T$^a$ associated with the straddle plates 29$^b$, as has already been described. There is a pair of gusset plates 21 attached to the body and disposed at one side of the straddle plate 29$^b$, and the cross link or bar T extends between these gusset plates 21 and is pivoted thereto by a pivot bolt 22. This cross bar or link T is also connected through the link 25 with the door 27, and serves in the same way as the links or cross bars T at the bolsters for controlling the opening and closing of the door 27. The cross bar T$^a$ extends between gusset plates 21$^a$ at the other side of the car and is secured thereto by pivot bolts 22. This cross link or bar T$^a$ is connected through the link 25$^a$ to the door 27$^a$ and controls the opening and closing of the door in the same manner as the links or cross bars T$^a$ associated with the underframe bolsters at the trucks.

The transverse supports consisting of the beam 29 and the straddle plate 29$^b$ are each provided with trunnion brackets 30, 30$^a$, and 31, 31$^a$. The trunnion brackets 30 and 31 support the power cylinders C, C, and the trunnion brackets 30$^a$, 31$^a$ support the power cylinders C$^a$, C$^a$. Each trunnion bracket 31 has an extension 32. The cross bars or links T are pivoted at 33 to these extensions on the trunnion brackets 30. Each trunnion bracket 30$^a$ has an extension 32$^a$ and the cross bars or links T$^a$ are pivoted at 33$^a$ thereto. The pivotal connections 16, 22 and 33 at one side of the car, all lie in substantially a line, and this is the fulcrum line on which the car swings to a tilted position for dumping at one side. The pivot points 16$^a$, 22$^a$ and 33$^a$, likewise all lie in a line, and this is the fulcrum line on which the car body tilts to the other side for dumping. The trunnion brackets 31 and 31$^a$ have an upward extension 33$^b$ (Figures 4 and 7) which lies close to and supports the knuckle of the respective links or bars when in their lowered position. Inasmuch as these cross bars or links T associated with the straddle plates are pivotally attached to the gusset plates 21, 21$^a$, the load of the car will in part be carried by the straddle plate and the beam 29, when in transport position, through the knuckle of the transverse bars or links contacting with these extensions 33$^b$.

The pivot points 22 and 22$^a$ on opposite sides of the car lie substantially in a line at right angles to the center sill or beam, and this necessitates a somewhat oblique positioning of the transverse bars or links. The car is made symmetrical about a longitudinal axis so far as the straddle plates are concerned, to avoid the use of right hand and left hand parts, and hence, as shown in Fig. 3, the link T is at the end of the trunnion bracket next to the power unit C at one pair of power units, and is removed therefrom at the other pair of power units. A similar condition is true of the links T$^a$ at the other power units and trunnion brackets.

The power units C, C, C$^a$, C$^a$ may be referred to in a general way at this point by stating that they have the cylinders 100 which may rock about the trunnions 101, 101$^a$ upon the outer ends of the straddle plates, with axes substantially in the same vertical plane as the axial lines 16, 22, 33 and 16$^a$, 22$^a$, 33$^a$ between the underframe and the dump body but shown as slightly below these axial lines. The piston rods 116 in each cylinder are projected under the effect of power medium when admitted into the cylinders, and are connected to the body by the pivot pins 121 journalled in the channel beams 122, 123 attached to the bottom of the dump body floor.

The operation of this portion of the construction will now be described.

When the power cylinders C, C for example, are energized, the respective side of the car body is raised from a level to a tilted position, i. e. from the position of Fig. 2 to that of Fig. 5. The transverse links T$^a$ move about their pivots 16$^a$ at their free ends, and the pivots at 22$^a$ and 24$^a$ merely move bodily but do not permit a rotational movement. The door 27$^a$ at the upper end is therefore positively held in closed position throughout such a movement of the body. These links T$^a$ also serve to hold the body to the underframe and to carry the weight of the body.

The transverse links T however remain in their former position with regard to the underframe, but serve in conjunction with the brackets 23 to receive a part of the weight of the body and load and to hold the former in fixed pivotal relation to the underframe.

Likewise the links T$^a$ pivoted at 33$^a$ pivot about this point, while those at T remain upon the underframe. As the car body tilts, therefore, a traction is exerted by the transverse links T upon the door operating links 25 to pull inwardly and upwardly upon the brackets 26 of the door, and cause the latter to swing clockwise outward and downward into the position represented in Fig. 5. The door 27 is therefore opened in proportion to the movement of the dump body, and is positive, and may be regulated in amount by regulating the tilting of the dump body.

When the power unit is de-energized, the dump body will return by gravity to the position shown in Fig. 2, and the transverse link T will act by the door operating link 25 to positively and proportionately return the door to its closed position.

Obviously when the other power cylinders C$^a$, C$^a$ are energized, the dump body will tilt about the pivots 16$^a$, 22$^a$, 33$^a$, and dump to the opposite side, in a corresponding manner.

It will be particularly noted that the power units apply their pressure force by action and reaction between the straddle plate assemblies on the underframe and against the dump body substantially at the trunnion line. During the initial stages of the tilting of the body, the loads at the two trunnion lines are substantially balanced, and there is no twisting or torsional strain on the underframe of the center sill thereof. As the body approaches dumping position, and as the load shifts toward the lower side of the dumping body in being discharged, the upper side is unloaded, but the weight is carried by the car body as a longitudinal girder and rests upon the ends of the cross members or bolsters 14 which are directly supported by the car trucks and truck bolsters. The load also rests in part on the straddle plates through the bearing of the knuckles of the transverse bars or links T and T$^a$ thereon, as above noted. Inasmuch as the load in part bears on the straddle plates 29$^b$ and the cross beam 29, this will, in a measure, produce a re-action opposed to the re-action of the power units at the other end of the straddle plates, and thus greatly reduce the torsional strain on the center beam. In other words, there is at no time any great twisting movement upon the center beam or sill of the underframe, and therefore, said center sill may be made relatively light in weight.

Referring to the power cylinders C, C$^a$, these each comprise a cylinder 100 having trunnions 101, 101$^a$ formed integrally therewith. The circumferential reinforcing ring or swell 102 supports the cylinder and insures that it will remain a true cylinder even under great stresses upon the cylinder and trunnions; and is shown in fragmentary vertical section in Fig. 8, and in horizontal section in Fig. 9, as increasing from a minimum at the trunnion axis to a maximum at 90 degrees therefrom about the cylinder axis. The cylinder 100 has an offset condensation cup 103 in its bottom wall 100$^a$, with a drain plug 104 therein. It may be remarked that it has been found advantageous to operate the mechanism with a slight amount of oil in the bottom of the cylinders, to assure lubrication and to retain any possible dirt which might enter. The exterior of the cylinder is reinforced by a plurality of longitudinal webs 100$^b$.

The telescoping cylinder 105 is a hollow member closed at the upper end by a wall 106 having the outwardly projecting hollow collar 107 thereon. This end wall 106 is stiffened against buckling by the webs 106$^a$ arranged substantially radially with regard to the center and connected to the collar 107. The external diameter of this telescoping cylinder is such as to enable it to slide freely in the cylinder casing 100, and a number of lugs 108 are provided on its surface at the bottom, which are machined to form a close sliding and guiding fit for the cylinder 105 during its movements. These lugs 108 are preferably short in a longitudinal direction with regard to the total length of the cylinder 105, to permit a maximum extension to the power unit: they form stops for limiting the movement of this cylinder 105 in the outer cylinder 100, in its upward movement, and extend around the lower edge of the telescoping cylinder 105 to form stops to engage the end wall 100$^a$ of the outer cylinder, as shown in Fig. 7, when the power unit is collapsed.

A clamping ring 109 is bolted to the top of the cylinder casing 100 and has an internal diameter proper to fit loosely upon the external surface of the telescoping cylinder 105, and to cooperate with the lugs 108 to provide a positive limitation for the outward movement of the telescoping cylinder 105. This ring 109 is provided internally with two annular grooves which respectively receive the flax packing 110 and the cupped leather packing 111. The clamping ring 109 is held firmly down upon the cylinder casing 100 by the cap screws 113, and a thin flexible sheet metal scraping plate 112 is placed beneath the heads of these cap screws. The resiliency and flexibility of this plate 112 permits it to adjust itself to the exterior surface of the telescoping cylinder, and to cut away the major portion of the dirt which may collect upon this cylinder when in the extended position, since it maintains less clearance with the cylinder 105 than the latter has with the clamping ring 109.

If any fine particles should pass between the telescoping cylinder wall and the metal scraping plate, the felt packing 110 will collect the particles and prevent them from cutting the cylinder wall.

The piston head 114 is hollow and has the piston rings 115 of the usual type. The piston rod 116 is likewise hollow with a passage 117 therein, and is secured to the piston 114 by the screw 118, which in the collapsed condition of the power unit may be received within the condensation offset cup 103. The free end of the piston rod passes through the collar 107 on the telescoping cylinder end wall, and is fitted to provide a guiding and sliding, substantially airtight joint therewith. Near the piston head 114 and near the free ends of this piston rod are provided several rows of apertures 150, 151, furnishing communication between the exterior and the interior of the hollow piston rod, as will be more fully described hereinafter.

The body thrust member 119 has an integral threaded stub 120 which engages rigidly with the hollow piston rod 116 and holds the member 119 and the rod 116 solidly together. A pivot pin 121 passes through the member 119 and is journalled in the channel beams 122 and 123 which like the beams 18 are securely welded to the car floor 17. The washers 124 are interposed on the pivot pin, which is held in the proper position by the cotter pin 125. A circular table and circular peripheral flange 126 are provided about the stud 120 to fit around the upper end of the piston rod 116 and the collar 107 in the collapsed position of the power unit, to prevent dirt from getting onto the piston during the travelling of the car while loaded. It is preferred to place a felt packing ring 126$^b$ upon this table to assist in sealing the joint; which preferably is so designed that it does not rest upon the collar with any force, in order to prevent a fracture of the cylinder 100 during travelling.

For the purpose of admitting the power medium to the interior of the cylinder casing, the trunnion 101 is made hollow, and has a closing wall 127 at its outer end, pierced by a hole 127$^a$ with a bevelled outer end. A plate 128 with a conical nozzle 129 is bolted to the end of the trunnion by the cap screws 129$^b$ to form a hermetic seal therewith. On the outer face, this plate 128 carries the ball-and-socket sealed joint 130 and the hose connection 131 thereon, to permit free oscillation of the power unit about its trunnions without interruption of or damage to the supplying pipe for the power medium.

The method of operation of this power unit is as follows:

With the dump body in the lowered or collapsed condition, a suitable power medium is introduced into the hose leading to the connection 131, as will be described hereinafter. This medium passes through the hole 127$^a$ into the hollow trunnion, and thence to the small annular space between the telescoping cylinder 105 and the cylinder 100, and finds its way downward therein and between the lugs 108 at the bottom of the telescoping cylinder 105, and thus gradually builds up a pressure under the telescoping cylinder 105 and the piston head 114, which upon increasing to the necessary extent, will raise the two elements together under normal conditions, owing to the greater area of the telescoping cylinder. As the latter moves upward, the passage in the hollow trunnion is finally uncovered and the fluid has free entrance into the space beneath the telescoping cylinder 107 and the piston head 114. The telescoping cylinder 105 finally presents its lugs 108 against the clamping ring 109 and is thereby prevented from further upward movement. At this point, by design, it is preferred that no substantial part of the load shall have been dumped. A continuing delivery of fluid medium into the power unit will cause the piston head 114 to be forced upward within the telescoping cylinder, until it in turn is brought to a standstill as will be set forth hereinafter. During this upward movement of the piston rod 116, first together with the telescoping cylinder 105 and thereafter independent thereof, the thrust member 119 presses upward against the beams 122, and thereby raises the body into a tilted position about the opposite trunnion as has already been set forth, during which the opening of the door, and finally the dumping of the load, occur. It will be understood that this is an illustration of the tilting operation: and that the final result to be obtained is the extension of the cylinder and piston within the outer cylinder, whereby the body is tilted.

When the load or any desired portion thereof has been dumped, the supply of power medium is shut off, and the body remains at the instantaneous position. By proper operation of the power medium supply system, as will be described hereinafter, the power medium may be permitted to escape through the hose line in a manner the reverse of its entrance thereto, so that the pressure beneath the piston head 114 and the telescoping cylinder 105 is relieved, and these elements in succession return to their original or collapsed positions.

In order to provide a positive cushioning and limitation of movement of the power unit, a series of apertures 150 are formed in the hollow piston rod 116 adjacent the piston head 114. Also a series of apertures 151 are disposed in the hollow piston rod 116 adjacent the upper end of the piston rod. The apertures in each group are arranged at successive distances from the end of the piston rod. The purpose of these apertures is to control the accumulation of air under pressure between the piston head 114 and the end wall 106 of the telescoping cylinder. The size and number of these apertures govern the degree of cushioning as desired for dumping different materials at various speeds. Closing all of these apertures would check the dumping speed in proportion to the clearance allowed around the piston rod. By this system, the power unit extends until the car body has been tilted as far as the relative movement of the cylinder 100 and the telescoping cylinder 105 will permit, which in general is insufficient to cause a discharge of a substantial quantity of material. The piston 114 then tends to extend within the telescoping cylinder 105, during which extension the air is slightly compressed in the space between the piston 114 and the end wall 106 of the telescoping cylinder. The series of apertures 151 are shortly thereafter uncovered, and the air thus compressed is permitted to escape through the apertures 150, the passage 117, and the apertures 151, to the atmosphere. This escape occurs so long as the apertures 150 are all uncovered and within the telescoping cylinder. As soon as the first or uppermost row of apertures 150 are covered by the end wall 106 of the telescoping cylinder, the flow of air through the passage 117 is decreased and the pressure within the aforementioned space begins to rise, and this effect increases as each successive row is blocked, until finally no air is permitted to flow into the passage 117, after which the pressure of the air remaining within the space increases until its effort upon the piston equals the upward effort exerted by the pressure medium beneath the piston and the pull of the body as occasioned by the inertia of its movement and any overbalancing by reason of the movement of the load during discharge: the car body is thus gradually brought to a stop at a point which may be predetermined by the selection of the number and position and sizes of the several rows of apertures 150 and 151.

A modified form of this control is shown in Fig. 15, in which the apertures 151 are dispensed with, and a channel is provided through the stud 120$^b$, the pivot pin 121$^b$, and by a connection plate 154 and the hose 155 to the cushioning tank 156: a valve 157 being disposed in the hose line and connected by a link 158 to a lever not shown, but which it will be understood is located at the controlling deck of the car. This form may be employed with either a liquid or with a gas. In the first case, the cushioning occurs by the regulation of the escape through the valve aperture: and in the second case both by this and by the compression of the gas, which may be kept at a superatmospheric pressure, since the tank 156 and its communicating channel are sealed from the atmosphere. The operator has it in his power, by admitting the fluid in the tank 156 to the space between the telescoping cylinder 105 and the piston head 114, or permitting it to escape therefrom, as the valve 157 is regulated, to so determine the relative pressures above and below the piston 114 that the extension of the power unit may be smoothly and accurately effected.

In the further modification of Fig. 16, the system is in general the same as that of Fig. 15, but the cushioning tank 156 is connected by the hose line 159 and the valve 160 directly with the space between the piston 114 and the telescoping cylinder 105 by a hose connection 161 provided in the end wall 106 of the telescoping cylinder. Appropriate clips 162 are provided to hold the hose in proper position during the movements of the power unit.

In both Figs. 15 and 16, it will be noted that by suspending the cushioning tank 156 from the car floor beams as shown, there is little relative movement of the hose line during the extension of the power unit: while it is yet feasible to suspend the tank from the underframe, by virtue of the flexibility of the connection by hose or by piping with ball-and-socket joints. The same tank may be employed for the two units on one side of the car, or for all four units, and may be controlled by the single valve in each instance.

The piping system is so disposed that one or more cars equipped with the mechanisms shown may be operated from the deck or control platform of any car in train. This piping system is connected at each car with the air pressure brake system of the train, and is connected for the length of the train by a separate pipe and hose line, so that if desired air may be directly supplied from the locomotive or other power plant independently of the air brake system. This latter feature is of particular value, since with heavier loads, it is possible to derive a greater lifting power by utilizing a higher air pressure than that available from the air brake pipe line.

The air brake train line 200 is shown in Fig. 10 as passing the length of the car, which is represented diagrammatically as extending from the connection and valve 201 at the left of the figure to the connection and valve 202 at the right of the figure. The car deck or platform is represented at the left at 203, and at it may be located the customary hand brake wheel 204 and such other car service as may be desired. This air brake train line is connected by the pipe 205 with the shut-off valve, triple valve, air cylinder and tank, and the air brake cylinders of customary type and conventionally represented at B in Fig. 10.

Compressed air is derived from this air brake train line through the pipe 206, which has the cut-out valve 206$^a$ with a small opening, so that the compressed air is only delivered through it at a rate which does not affect the braking of the cars in train or singly: the cutout valve 206$^a$ when closed excludes the car dumping system from the air brake system at the particular car. It is preferred to provide a strainer and check valve 207 in the pipe 206, which leads to the train dumping reservoir line 208, which passes from the connection and valve 209 at the left end of the represented car to the connection and valve 210 at the right end of the car, so that all cars so equipped, when operated in train, may derive their supply of air through the branch pipe 206 on any one or more of the cars, accordingly as the valves 206$^a$ on the cars are opened, or may all derive their power from the engine direct as indicated above.

A branch pipe 211 from this train dumping reservoir line 208 leads through a cutout valve 212, which permits the exclusion of any car from this line 208 in case of trouble with its dumping plant, and through a check valve and strainer 213 to a dump storage reservoir 214. The storage reservoirs 214 on all cars are, in train operation, brought to the same initial pressure from the pipe line 208.

A pipe 215 leads from the storage reservoir 214 to the automatic control valve V, and thence a pipe 215$^a$ leads to the three-way valve 216, which directs the supply of air to one or the other side of the car, or shuts the passage completely; so that one or the other power unit equipments C, C or C$^a$, C$^a$ are energized or both deenergized according to the setting of this three-way valve 216. For this purpose, there are two power unit supply pipe mains 217 and 217$^a$ leading from the three-way valve 216 which branch and pass by suitable hose connections to the inlets 131 on the respective power units.

The train multiple control line 218 extends the length of the car from the connection and valve 219 at the left end to the connection and valve 220 at the right end, and permits the operation of any car or cars from the deck of any car or cars, as the operator may have previously determined and provided for. A branch pipe 221 from this pipe line 218 leads to the automatic valve V, and serves to control the same. Another branch pipe 222 from the pipe line 218 leads to the control valve 223 disposed beneath the car and having the pipe line 224 extending therefrom to the reservoir pipe 215, so that by the valve 223, air may be admitted to or released from the train multiple control line 218.

The automatic valve V, as shown in Fig. 17, consists of a control valvehead 250 in the upper portion adapted to close or disclose the port 251 which forms a communication between the reservoir pipe 215 and the pipe 215$^a$ leading to the three-way valve 216. This valvehead is normally held down upon the port in closed position by a spring 252. In the lower part of the valve casing is a piston 253 of large diameter and exposed to the air pressure arriving from the multiple control pipe 218 through the branch pipe 221. When pressure increases in this branch pipe 221, the piston 253 is raised against the action of the return spring 254 until the smaller piston 255 shuts off the ports 256 leading to the exhaust pipe 257 which communicates with the atmosphere. Shortly thereafter, the pistons engage with the downwardly extending stem 250$^a$ of the valvehead 250 and raise this valvehead off the port 251, and the air in the reservoir is permitted to flow from the pipe 215 through the port into the pipe 215$^a$. When the pressure is released from beneath the large piston 253, both pistons move downward under the action of the return springs 252 and 254 and the air pressure against the top of the piston 255 until the valvehead 250 is seated; after which the spring 254 and the pressure against the top of piston 255 returns the smaller and larger pistons independently of the valvehead, until the ports 256 are again uncovered, and the air in the system connected to the pipe 215$^a$ is permitted to escape to the atmosphere. A small bleeder opening 257$^a$ is preferably provided between the space above the larger piston and that above the smaller piston, to equalize the pressures therein gradually.

On the deck of the car is disposed the direction control shaft 225 with the handle 226, and journalled in the bracket 227 attached to the car railing 228 and in the deck floor. This shaft 225 has a crank 225$^a$ at its lower end which is connected to the direction control link 229 which passes beneath the car body to the control handle of the three-way valve 216. When the handle 226 is in the position shown, the three-way valve 216 keeps all four power units excluded from connection with the automatic valve, and the car cannot be dumped even if the automatic valve V is actuated: this is the normal position during travelling, and is also used in controlling the tilting and dumping of the body. When the handle is moved to either end position, so that it points either to the right or the left side of the car (corresponding to the down and up positions in the figure), the three-way valve 216 will connect the power units C$^a$, C$^a$ or the power units C, C respectively to the automatic valve, so that upon operation of the automatic valve V, these power units will raise the corresponding side of the dump body and cause a dumping or discharge towards the opposite side, i. e. that towards which the handle is pointing. It is obvious therefore that the direction control serves to select the direction or side towards which the particular car will dump, and must be regulated on each particular car before dumping may proceed; and that if regulated to alternate sides with alternate cars, the dumping will occur to alternate sides. In Fig. 13, the three-way valve is shown in the position in which the power medium is shut off: in Fig. 13$^a$, the valve permits the medium to flow to the cylinders for dumping to the left: and in Fig. 13$^b$, to those for dumping to the right.

This direction control is further used to determine the speed of dumping of the particular car, by being adjusted to pass the air at a predetermined rate or by successive increments by manual control at the particular car.

There is likewise provided at the car deck a dumping control shaft 230 which has a handle 231 and is journalled in the bracket 232 attached to the railing 228 as well as in the deck floor. This shaft carries two cranks 233 and 234 at its lower end: the crank 233 is pivotally connected to the dumping release rod 235 which extends across the width of the car beneath the deck so that its ends 236, 236$^a$ may be easily grasped by an operator standing upon the right-of-way alongside the end of the car. The other crank 234 is connected by a link 237 with the dumping control valve 223. It is preferred to provide a lock mechanism 238 to hold the handle 231 in the position indicated in Figs. 10 and 11, in which the shaft and its associated cranks and links are held in the non-dumping position during travelling, without the danger of willful or accidental actuation of the dumping system. In Fig. 12, the valve 223 is shown in the position for releasing the pressure in the train multiple control line to the atmosphere at that particular car to return the body or bodies of all cars in train after dumping: in Fig. 12$^a$, the valve is shown in the neutral or blind position, in which the car dump body may be controlled from any other car; and in Fig. 12$^b$, the valve is shown in the position in which a control is effected on the particular car to cause a dumping of that and any other cars connected in train.

A locking system is provided by which the power units on the low side of the car cannot be energized after the car has begun to tilt. This is shown in Figs. 13 and 14, in which a plate 240 is fastened rigidly to the direction control link 229. A plate 241 is held opposite the central or neutral position of the plate 240 by a sleeve 241$^a$ guided by rails 242 on the underframe beam 13 and carried on a rod 242$^a$ which has a permissive vertical sliding movement in the brackets 243 attached to this beam 13. A spring 244$^a$ tends to force the rod upward against a member 18$^c$ of the body floor at a point intermediate the laterally spaced fulcrums of the body relative to the frame. When the body is lowered, the rod 242$^a$ is forced downward against the action of the spring, and the plate 240 is free and the link 229 may move from one end position to the o'her. When it is desired to dump the car, the link 229 is moved to one end position, and the air admitted to the power unit. As the car body is raised, the rod 242$^a$ follows it, and the plate 241 is presented in the path of movement of the plate 240, so that thereafter the link 229 may not be returned to beyond the central or neutral position. In this way, this link may be used to control the rate of admission of air through the three-way valve 216, with the assurance that an inadvertent movement beyond the neutral or blind position will not cause an undue strain upon the car by delivery of air to both sets of power units at once.

When the car body returns to the lowered position, the rod 242$^a$ is forced downward to remove the plate 241 from the path of plate 240 again.

The operation of the piping system in general is as follows: When a car is coupled in train, the hose connection at 201 or 202 or both is supplied with air for the brake service in the usual way. The operator then, if the valve 206$^a$ has been closed, may open it to obtain air in the train storage reservoir line 208, and thus in the dump storage reservoir 214. Obviously, if more than one car is in train, and the connections at 209 and/or 210 are made, compressed air will flow through the train storage line from one car to another, and may even be derived at the locomotive from a separate hose connection; and all the dump storage reservoirs will be filled therefrom on all cars in which the cutoff valves 212 have not been closed. As soon as the requisite air has been supplied to replete the air brake system, the car may be moved, since as indicated above, the valves 206$^a$ have such small ports that the brake service is not affected.

When it is desired to dump a car, the handle 226 on that car is set to indicate the direction of dumping, as set forth above: if more than one car is to be controlled in train, the three-way valve on each car may be set in the same direction, or in alternately opposite directions, or otherwise as the operator may desire.

As the car approaches the point for dumping, or is halted thereat, the operator may actuate the dumping control shaft 230 either from the deck of any car by the handle 231 or from the right-of-way by pushing or pulling the proper ends 236, 236$^a$ of the rod 235, to manipulate the dumping control valve 223. Air is thereby permitted to pass from the dump storage reservoir of the car from which actuation occurs into the train multiple control line 218 through the valve 223, and thus to the automatic valves V of all cars in train. This automatic valve V will respond by admitting air from the dumping reservoir through itself to the three-way valve 216, and thence to the proper power units, C, C or C$^a$, C$^a$. The operator by regulating the position of each of the three-way valves from time to time may determine the rate of dumping of the particular car, and discharge the whole or any desired part of the load. At any time, the dumping control valve 223 may be actuated to disconnect the train multiple control line 218 from the dumping reservoir, and connect it to the atmosphere, as shown in Fig. 12$^a$, so that the pressure in this line 218 and in the automatic valves V is released, and the valves V will cut off the supply of air from the dumping reservoirs to the power units, and permit the air contained in the latter to be discharged to the atmosphere, so that the units will collapse and lower the dump body.

As a specific instance, assuming that a single car is in train and to be operated, as soon as this car is connected to the locomotive, air is admitted into the air brake train line 200 and passes along the car, so that it is available for operating the air brake B. A portion of this air likewise passes by the branch pipe 206 to the feed line 208, and thence by pipe 211 to the dump storage reservoir 214 and by pipe 215 to automatic valve V where it is stopped. A further branch pipe 224 from pipe 215 leads to the dumping control valve 223 where it is likewise stopped. Assuming now that it is desired to dump the car toward the right or the bottom edge of the vehicle, the operator at any time may move the dumping control handle 226 counterclockwise until it points downward in the vehicle, thereby exerting a tension upon the connection 229 and moving the three-way valve 216 into the position shown in Fig. 13$^b$. Since no air passes to the three-way valve 216 because of the closure of the automatic valve V, nothing happens at this time. When it is desired to dump the car, the operator moves the shaft 213 whereby to actuate link 237 and move the dumping control valve 223 into the position shown in Fig. 12b. Air is now permitted to pass from pipe 224 through valve 223 by pipes 222 and 218 and the branch pipe 221 into the automatic valve V, and actuate this valve so that the air from pipe 215 is afforded clear passage to pipe 215a and to the three-way valve 216. In consequence of the seating of valve 216, the air now passes to the lateral bus line 217a and thence by connections 131 and trunnions 101 to the dumping cylinders Ca, which extend and cause the car body to be tilted. This tilting movement may be stopped by shifting the shaft 225 by handle 226 to shut off the movement of air through the three-way valve 216: i. e., by moving the valve into the position shown in Fig. 13. When a sufficient quantity of material has been dumped from the car, the operator again moves the shaft 230 by handle 231, for example, whereby the dumping control valve 223 is moved from the position of Fig. 12b to the position of Fig. 12a, in which the car body is held against tilting by the control valve 223, and for further security the three-way valve 216 may likewise be set as shown in Fig. 13 if so desired: these two valves both serve to shut off the flow of air in such neutral positions, and thus hold the car body in its tilted position. When it is desired to return the car body to its lower or normal transport position, the dumping control valve 223 is moved to the position of Fig. 12, in which the air pressure in pipe lines 222, 218, 221 is relieved through the dumping control valve 223, so that the automatic valve V effects a closure so that air may no longer pass from pipe 215 into pipe 215a, and on the other hand, the air within the dumping cylinder Ca and the lateral bus 217a is permitted to return through the three-way valve to the automatic valve V and be exhausted to the atmosphere through the outlet 257 at a rate which may be controlled by the position of the three-way valve 216 as before. When all of the air has escaped, the body has returned to its lower position. The dump control valve 223 in the position of Fig. 12 has likewise shut off and blocked any movement of air from pipe 224 into pipe 222 or to the atmosphere.

If it had been desired to dump to the opposite side, the handle 226 would have been turned clockwise so that it would point upward in the figure, whereby the three-way valve 216 would have been moved to the position of Fig. 13a, and the air from the pipe 215a would then have passed into the lateral bus line 217 and thence to the dumping cylinders C: and the further operation by the control valve 223 would have been the same as before.

From the above it will be apparent that a very strong and durable car body has been provided with a mounting on which it rests in stable equilibrium during transport, and each car is equipped with a power mechanism for tilting the body and with automatic control devices for the downfolding side doors. The car body is mounted on the underframe having the center sill and bolsters carrying fulcrum brackets for the body which are disposed in the region of the bolsters of the trucks. Said underframe also has projecting from said center sill supporting members for the power units, and the body makes contact with these supporting members during the tilting thereof so as to reduce to a minimum the torsional strain on the center sill. All of these features contribute to a very strong and durable car construction which is particularly adapted for railroad service. It is obvious, however, that many features of the car are equally adapted to road service, and the term "vehicle" as used throughout the description is intended to cover broadly a dump car for either a track service or road service. While there has been shown a control mechanism having link connections to the doors, it will be understood that from certain aspects of the invention, other types of control devices for the doors may be used, the essential features, so far as the controlling of the doors is concerned, reside in a control device which positively prevents movement of the doors during transport and at the elevated side during dumping, and a releasing of the door at the dumping side to permit it to open under control, and a positive closing of the same. It is obvious that many changes in the details of construction may be made without departing from the spirit of the invention as set forth in the appended claims.

Having thus described my invention, what I claim as new and patentable is:

1. In a dump vehicle, a dump body adapted to tilt selectively to either side for dumping, a pair of fluid pressure power units to tilt said body to respective sides for dumping, a fluid pressure line on said vehicle, a fluid storage reservoir, a conduit connecting said fluid pressure line with said reservoir and containing a non-return valve, an automatic valve having an actuating means, a dumping control valve, a direction-of-dumping valve and means to operate the same, respective conduits connecting said direction-of-dumping valve with the power units, a conduit from said reservoir to said actuating means of said automatic valve and including said dumping control valve, a conduit establishing communication from said reservoir through said automatic valve to said direction-of-dumping valve, said dumping control valve controlling the actuation of said automatic valve whereby to establish communication between the power unit selected by said direction-of-dumping valve and said reservoir and between said selected power unit and the atmosphere, and means to regulate said control valve to govern the operation of said automatic valve.

2. In a dump vehicle, a dump body, means including plural fluid pressure power units to tilt said body for dumping in different directions, a fluid pressure supply line on said vehicle, a fluid storage reservoir, a conduit including a non-return valve for connecting said supply line to said reservoir, a multiple-way valve, an automatic valve having a fluid pressure actuated means for opening it, a reservoir fluid pressure line from said reservoir to said multiple-way valve and including said automatic valve, individual conduits from said multiple-way valve to said power units, a control pipe communicating with said actuating means, and a manually operable valve connected to said control pipe and one of said lines and having communication to the atmosphere and adapted to connect said control pipe with the said line or with the atmosphere whereby to control the opening and closing of said automatic valve.

3. In a dump vehicle, a dump body adapted to tilt selectively to either side for dumping, two fluid pressure units to accomplish such selective tilting, a source of fluid pressure medium, an automatic valve, a three-way valve, a conduit from said source through said automatic valve to said three-way valve, pipes to each of said power units from said three-way valve to energize the selected unit, a control conduit including a valve from said source to said automatic valve to actuate the same, and means to move said three-way valve to selectively admit the fluid pressure medium from said automatic valve to said units and to exclude it therefrom.

4. In a dump vehicle, a dump body adapted to tilt selectively to either side for dumping, two fluid pressure units to accomplish such selective tilting, a source of fluid pressure medium, an automatic valve, a three-way valve, a conduit from said source through said automatic valve to said three-way valve, pipes to each of said power units from said three-way valve to energize the selected unit, a control conduit including a valve from said source to said automatic valve to actuate the same, means to move said three-way valve to selectively admit the fluid pressure medium from said automatic valve to said units and to exclude it therefrom, and means to prevent the admission of fluid pressure medium to either of said power units while the other is energized.

5. In a dump vehicle, a frame, a dump body supported on laterally spaced fulcrums on said frame whereby the body is maintained against dumping during normal transport, fluid pressure operated power units to tilt said body about a respective fulcrum for dumping, said power units being respectively connected to said frame and body on axes located substantially in the vertical plane passing through the fulcrum on the side of the vehicle opposite that about which the respective unit is adapted to tilt the body, a source of fluid pressure medium on the vehicle, a multiple-way valve, a conduit connecting said source with said multiple-way valve, a control valve in said conduit for selectively connecting said multiple-way valve to said source and to the atmosphere, and individual conduits from said multiple-way valve to the respective power units, said multiple-way valve serving to permit the fluid medium to pass through said control valve from said source to one of said units or from said unit to the atmosphere and to prevent the passage of fluid medium to and from the other of said units.

6. In a dump vehicle, supporting trucks, a central longitudinal beam, bolsters and pivots on said trucks to support said beam pivotally, a dump body adapted to be tilted to either side for dumping, laterally spaced longitudinal fulcrums rigidly attached to said beam and adapted to support said dump body upon axes beyond the center of gravity of said body when empty so that said body rests in stable equilibrium upon said fulcrums for normal transport and so that said body may return by gravity from tilted position, and means attached to said body and said underframe to permit said body to tilt to either side, said means being located substantially above the bolsters.

7. In a dump vehicle, an underframe, a dump body, said underframe including a center sill having laterally projecting brackets at opposite sides thereof, longitudinal trunnions for said body mounted on said brackets at opposite sides of the longitudinal center line of the body and widely spaced from each other so as to prevent said body from accidental dumping during transport, means to secure said body to said underframe and to permit it to tilt to either side about the respective trunnion for dumping, power mechanisms at each side of the center line of the vehicle to tilt said body, and pivotal mountings for said power mechanisms attached to said underframe substantially coaxial with said respective trunnions.

8. In a dump vehicle, an underframe, a dump body, means attached to said underframe and said dump body to permit the latter to tilt for dumping to either side, power mechanisms to tilt said dump body to either side, means including a common supply main and a selecting device to determine the selective actuation of said mechanisms, and adjustable control means operating independently of said mechanisms to determine the speed of movement thereof.

9. In a dump vehicle, an underframe, a dump body, means attached to said underframe and said dump body to permit the latter to tilt for dumping to either side, independent power tilting mechanisms to raise a respective side of said body, means including a common supply main and a selecting device to determine the selective actuation of said mechanisms, said power mechanisms including fluid operated double-acting cylinders and pistons, said mechanisms being operated for tilting the vehicle by the admission or withdrawal of fluid medium at one side of the respective piston, and means for selectively controlling the escape of fluid medium from the opposite side of said respective piston whereby to regulate the speed of movement of the respective mechanism.

10. In a dump vehicle, an underframe, a dump body, means to permit said dump body to tilt to either side upon said underframe for dumping, power mechanisms on each side of the underframe to effect the tilting of the dump body for dumping, means including a common supply main and a selecting device to determine the selective actuation of said mechanisms, and means to lock said selecting device to prevent movement thereof to actuate one of said mechanisms while the other is being actuated.

11. In a dump vehicle, a frame, a dump body supported on laterally spaced fulcrums on said frame whereby the body is supported in stable equilibrium during normal transport, fluid pressure operated power units to tilt said body about a respective fulcrum for dumping, said power units being respectively connected to said frame and body on axes located substantially in the vertical plane passing through the fulcrum on the side of the vehicle opposite that about which the respective unit is adapted to tilt the body, a source of fluid pressure medium on the vehicle, a multiple-way valve, a conduit connecting said source with said multiple-way valve, individual conduits from said multiple-way valve to the respective power units, said multiple-way valve serving to permit the fluid medium to pass from said source to one of said units and to prevent the passage of fluid medium to and from the other of said units, and means operated by the tilting of the dump body from normal transport position to block the movement of said multiple-way valve whereby to prevent the delivery of fluid medium to the power unit located at the side of the car about which the dump body is tilted.

12. In a dump vehicle, an underframe, a dump body, means to permit the dump body to tilt to either side upon said underframe for dumping, power mechanisms to effect the tilting of the dump body for dumping, means including a common supply main and a selecting device to determine the selected actuation of said power mechanisms, said selecting device including a multiple-way valve adapted to occupy open positions in which it establishes communication between the supply main and a respective power mechanism for tilting in the respective direction, and a blind position in which all such communications are closed, and means operated by the tilting of said dump body from its normal position to prevent the movement of said multiple-way valve from one open position to another open position while permitting the movement of said multiple-way valve between the selected open position and the blind position whereby the multiple-way valve may be employed for controlling the admission of fluid medium from said common supply main to the respective power mechanisms.

13. In a dump vehicle, an underframe, a dump body, supporting wheels for said underframe spaced apart laterally, trunnions to support said dump body on said underframe for selective tilting in either direction and spaced laterally from the center line of the vehicle to insure stability of said dump body upon the underframe during transportation, selective raising mechanisms pivotally mounted on said underframe substantially above the tread surface of said wheels and adapted to raise the respective side of the dump body for tilting about the opposite trunnions, side doors pivotally mounted on said dump body, and door operating devices for said doors to positively open the door adjacent the trunnions selected for tilting during such tilting.

14. In a dump vehicle, an underframe, a dump body, said underframe including a center sill having laterally projecting brackets at opposite sides thereof, longitudinal trunnions for said body mounted on said brackets at opposite sides of the longitudinal center line of the body and widely spaced from each other so as to prevent said body from accidental dumping during transport, means to secure said body to said underframe and to permit it to tilt to either side about the respective trunnion for dumping, power mechanisms located at each side to tilt said body in opposite directions for dumping, pivotal mountings for said power mechanisms attached to said underframe substantially in the vertical plane through the respective trunnions, side doors pivoted to said body to fold down for dumping, and door control mechanisms pivoted to the body and cooperating with said doors and underframe for controlling the opening and closing movements of the associated doors as the body is tilted, said mechanisms being pivoted to the body substantially co-axially with said trunnions.

15. In a dump vehicle underframe, the combination of a center sill, a cylinder supporting member connected to said center sill and projecting laterally therefrom, a bearing support mounted on the top of said member, the body dumping cylinder of the vehicle having a trunnion mounted in said bearing, side doors for the vehicle through which the load on the vehicle may be dumped upon the tilting of the vehicle about an axis adjacent the respective door, means to control the operation of the door so that the doors are held closed during normal transport and during dumping toward the opposite side, and are permitted to open during dumping toward the adjacent side, and pivot means connected to said bearing and to said door operating means adjacent the pivotal axis of said trunnion.

16. A dump vehicle comprising an underframe having supporting members at opposite sides thereof, a car body provided with supporting members adapted to engage said supporting members on the under frame, said supporting members constituting spaced fulcrums about which said car body may be tilted selectively for dumping, said fulcrums being spaced so as to maintain said body against dumping during transport, a door pivoted at each side of the body to fold down, each door having depending extensions, a plurality of independent control members for each door located beneath the car body, said control members cooperating with the extensions on the doors for controlling the opening and closing of the doors and for holding the doors in closed position, each of said control members being pivotally supported on said body on lines substantially co-axial with the said spaced fulcrums, at least two said control members for each door being longitudinally spaced from the supporting members on said body and underframe, and means cooperating with the underframe for maintaining said control members in fixed position relative to the underframe when said body is in horizontal position for transport, and in substantially fixed position relative to said underframe at the side of dumping when said body is tilted, whereby the tilting of the body operates through said control members to control the opening and closing of the door.

17. A dump vehicle comprising an underframe having supporting members at opposite sides thereof, a car body provided with supporting members adapted to engage said supporting members on the under frame, said supporting members constituting spaced fulcrums about which said car body may be tilted selectively for dumping, said fulcrums being spaced so as to maintain said body against dumping during normal transport, a door pivoted at each side of the body to fold down, each door having depending extensions, a plurality of independent control members for each door located beneath the car body, said control members cooperating with the extensions on the doors for controlling the opening and closing of the doors and for holding the doors in closed position, each of said control members being pivotally supported on said body on lines substantially co-axial with said fulcrums, at least two said control members for each door being longitudinally spaced from the supporting members on said body and underframe, and means cooperating with the underframe for maintaining said control members in fixed position relative to the underframe when said body is in horizontal position for transport, and in substantially fixed position relative to said underframe at the side of dumping when said body is tilted, whereby the tilting of the body operates through said control members to control the opening and closing of the door, said control members remaining in fixed position relative to said body and movable therewith when said body is raised from horizontal position for holding the door locked in closed position.

18. A dump vehicle comprising an underframe having supporting members at opposite sides thereof, a car body provided with supporting members adapted to engage said supporting members on the underframe, said supporting members constituting spaced fulcrums about which said car body may be tilted selectively for dumping, said fulcrums being spaced so as to maintain said body against dumping during normal transport, a door pivoted at each side of the body to fold down, each door having depending extensions, a plurality of independent control members for each door located beneath the car body, said control members cooperating with the extensions on the doors for controlling the opening and closing of the doors. and for holding the doors in closed position, each of said control members being pivotally supported on said body on lines substantially co-axial with said fulcrums, at least two said control members for each door being longitudinally spaced from the supporting members on said body and underframe, means cooperating with the underframe for maintaining said control members in fixed position relative to the underframe when said body is in horizontal position for transport, and in substantially fixed position relative to said underframe at the side of dumping when said body is tilted, whereby the tilting of the body operates through said control members to control the opening and closing of the door, and independent power devices disposed upon the opposite side of the frame for selectively tilting the body to effect the dumping.

19. A dump vehicle comprising an underframe having supporting members at opposite sides thereof, a car body provided with supporting members adapted to engage said supporting members on the underframe, said supporting members constituting spaced fulcrums about which the car body may be tilted selectively for dumping, a door pivoted at each side of the body to fold down, a plurality of independent mechanisms for each door for automatically, independently and selectively controlling the opening and closing of the doors when dumping is being effected, and for holding the door closed during transport and when elevated for dumping at the other side, each door controlling mechanism including a control member pivotally connected to the body on lines substantially co-axial with said fulcrums and operated upon by said underframe, at least two said control mechanisms for each door being longitudinally spaced from the supporting members on said body and underframe, said fulcrums being spaced whereby the body is maintained in stable equilibrium during transport and the gravitational action of the body operates through said control members to hold the doors closed during transport.

20. A dump vehicle comprising an underframe having supporting members at opposite sides thereof, a car body provided with supporting members adapted to engage said supporting members on the underframe, said supporting members constituting spaced fulcrums about which the car body may be tilted selectively for dumping, a door pivoted at each side of the body to fold down, a plurality of independent mechanisms for each door for automatically, independently and selectively controlling the opening and closing of the doors when dumping is being effected, and for holding the door closed during transport and when elevated for dumping at the other side, each door controlling mechanism including a control member pivotally connected to the body on lines substantially co-axial with said fulcrums and operated upon by said underframe, at least two said control mechanisms for each door being longitudinally spaced from the supporting members on said body and underframe, said fulcrums being spaced whereby the body is maintained in stable equilibrium during transport and the gravitational action of the body operates through said control members to hold the doors closed during transport, and independent power devices disposed upon the opposite side of the frame for selectively tilting the body to effect the dumping.

21. A dump vehicle comprising an underframe having supporting members at opposite sides thereof, a body provided with supporting members, said supporting members cooperating to constitute spaced fulcrums about which said body may be tilted selectively for dumping and by which said body is supported against dumping during normal transport, side doors pivoted to said body to fold down for dumping and having depending extensions, and a plurality of door control mechanisms for each door, at least two said control mechanisms for each door being longitudinally spaced from the supporting members on said body and underframe, each said door control mechanism being pivotally supported on the body beneath the same and including means cooperative with the frame and the depending extension on the associated door for maintaining said mechanism substantially in fixed position relative to the underframe when said body is in horizontal position for transport, and in substantially fixed position relative to said underframe at the side of dumping when said body is tilted, whereby the tilting of the body operates through said mechanisms to control the opening and closing of the door at the dumping side.

22. A dump vehicle comprising a center sill, longitudinally spaced wheeled supports for the said center sill, laterally projecting members on said center sill, at least two said projecting members being body supporting members and located between said wheeled supports, a body having depending supporting members engageable with said projecting supporting members so that said supporting members cooperate to constitute widely spaced lateral fulcrums about which the body may tilt and also to provide supports for said body against dumping during normal transport, lifting devices pivoted to said projecting supporting members substantially co-axially with said fulcrums and selectively operable for tilting said body, side doors pivoted to said body to fold down for dumping, and a plurality of door control mechanisms for each door pivoted to said body and each cooperating with the associated door and said projecting members for independently, selectively and automatically controlling the opening and closing of the associated door during dumping toward the side at which the associated door is located, and for holding the associated door closed during tilting toward the opposite side and during normal transport, at least one said mechanism for each door being longitudinally spaced from said supporting members.

23. In a dump vehicle, supporting trucks, a longitudinal center sill pivotally mounted on said trucks, a dump body, laterally extending supporting members rigidly fixed to said center sill, power devices carried by said members and operating to tilt the body in either direction for dumping, bolster brackets rigidly attached to said center sill, supporting fulcrums adjacent the outer end of said brackets, fulcrum members on said body adapted to engage said supporting fulcrums, said body having bearing support on said supporting members for the power devices when the body is tilted for dumping at the side adjacent dumping, whereby the torsional strains on the underframe are reduced.

24. In a dump vehicle, an underframe, a dump body, said underframe including a center sill having laterally projecting brackets at opposite sides thereof, fulcrum supports for said body carried by said brackets, said fulcrum supports being located at opposite sides of the center line thereof and widely spaced from each other so as to prevent said body from accidentally dumping during transport, said body being selectively rockable on said fulcrum supports for dumping at either side, power lifting mechanisms disposed at opposite sides of the center line of the underframe for rocking said body to dumping position to either side, a door at each side of said body and hinged thereto to fold down for opening, and independent door controlling devices for said door rendered operative by the tilting of the body for automatically, independently and selectively controlling the opening of the door through which dumping is to be effected and for positively closing said door when said body is returned to transport position.

25. In a dump vehicle, an underframe, a dump body, said underframe including a center sill having laterally projecting brackets at opposite sides thereof, fulcrum supports for said body carried by said brackets, said fulcrum supports being located at opposite sides of the center line thereof and widely spaced from each other so as to prevent said body from accidentally dumping during transport, said body being selectively rockable on said fulcrum supports for dumping at either side, power lifting mechanisms disposed at opposite sides of the center line of the underframe, each power lifting mechanism having a bearing connection with the body and the underframe, said power lifting mechanisms being disposed so that the forces thereof are exerted on said underframe substantially at points in a vertical plane through the respective fulcrum lines, a door at each side of said body and hinged thereto to fold down for opening, and independent door controlling devices for said door rendered operative by the tilting of the body for automatically, independently and selectively controlling the opening of the door through which dumping is to be effected and for positively closing said door when said body is returned to transport position.

26. In a dump vehicle, a body, an underframe including a center sill having laterally projecting bolster brackets at opposite sides thereof fixedly connected thereto, fulcrum supports adjacent the outer ends of said bolster brackets, said dump body having fulcrum members engaging the fulcrum supports on the underframe and rockable selectively thereon for dumping to either side, power lifting mechanisms disposed at opposite sides of the center line of the underframe for rocking said body to dumping position to either side, a door at each side of said body and hinged thereto to fold down for opening, and independent door controlling devices for said door for automatically, independently and selectively controlling the opening of the door through which dumping is to be effected and for positively closing said door when said body is returned to transport position.

27. In a dump vehicle, supporting trucks having transversely extending bolsters, an underframe including a center sill pivotally connected to said truck bolsters, said underframe having laterally projecting bolster brackets at opposite sides thereof rigidly fixed thereto and overlying said truck bolsters, fulcrum supports adjacent the outer ends of said bolster brackets, a dump body having fulcrum members adapted to engage the fulcrum supports on said underframe bolster brackets and rockable selectively thereon for dumping to either side, power lifting mechanisms disposed at opposite sides of the center line of the underframe for rocking said body to dumping position to either side, a door at each side of said body and hinged thereto to fold down for opening, and independent door controlling devices for said door for automatically, independently and selectively controlling the opening of the door through which dumping is to be effected and for positively closing said door when said body is returned to transport position.

28. In a dump vehicle, supporting trucks adjacent each end thereof, each truck having transversely extending bolsters, an underframe including a center sill supported on said truck bolsters, said underframe having laterally projecting bolster brackets at opposite sides thereof and overlying said truck bolsters, a body having fulcrum members adapted to engage the fulcrum supports on said underframe bolster brackets and selectively rockable thereon for dumping to either side, power lifting mechanisms disposed at opposite sides of the center line of the underframe and intermediate said trucks for rocking said body to dumping position to either side, a door at each side of said body and hinged thereto to fold down for opening, and independent door controlling devices for said door for automatically, independently and selectively controlling the opening of the door through which dumping is to be effected and for positively closing said door when said body is returned to transport position.

29. In a dump vehicle, supporting trucks adjacent each end thereof, each truck having transversely extending bolsters, an underframe including a center sill supported on said truck bolsters, said underframe having laterally projecting bolster brackets at opposite sides thereof and overlying said truck bolsters, a body having fulcrum members adapted to engage the fulcrum supports on said underframe bolster brackets and selectively rockable thereon for dumping to either side, power lifting mechanisms disposed at opposite sides of the center line of the underframe for rocking said body to dumping position at either side, said center sill having laterally projecting members rigidly fixed thereto, and said power lifting mechanisms having bearing connections with said supporting members, said body having bearing support on said supporting members when the body is tilted for dumping at the side adjacent dumping whereby the torsional strains on the underframe are reduced.

30. In a dump vehicle, supporting trucks adjacent each end thereof, each truck having transversely extending bolsters, an underframe including a center sill supported on said truck bolsters, said underframe having laterally projecting bolster brackets at opposite sides thereof and overlying said truck bolsters, a body having fulcrum members adapted to engage the fulcrum supports on said underframe bolster brackets and selectively rockable thereon for dumping to either side, power lifting mechanisms disposed at opposite sides of the center line of the underframe for rocking said body to dumping position at either side, said center sill having laterally projecting members rigidly fixed thereto, and said power lifting mechanisms having bearing connections with said supporting members, said body having bearing support on said supporting members when the body is tilted for dumping at the side adjacent dumping whereby the torsional strains on the underframe are reduced, a door at each side of said body and hinged thereto to fold down for opening, and independent door controlling devices for said door for automatically, independently and selectively controlling the opening of the door through which dumping is to be effected and for positively closing said door when said body is returned to transport position.

31. In a dump vehicle, supporting trucks adjacent each end thereof, each truck having transversely extending bolsters, an underframe including a center sill supported on said truck bolsters, said underframe having laterally projecting bolster brackets at opposite sides thereof and overlying said truck bolsters, a body having fulcrum members adapted to engage the fulcrum supports on said underframe bolster brackets and selectively rockable thereon for dumping to either side, power lifting mechanisms disposed at opposite sides of the center line of the underframe for rocking said body to dumping position at either side, said center sill having laterally projecting members rigidly fixed thereto, and said power lifting mechanisms having bearing connections with said supporting members, said body having bearing support on said supporting members when the body is tilted for dumping at the side adjacent dumping whereby the torsional strains on the underframe are reduced, a door at each side of said body and hinged thereto to fold down for opening, and independent door controlling devices for said door for automatically, independently and selectively controlling the opening of the door through which dumping is to be effected and for positively closing said door when said body is returned to transport position, said underframe cooperating with said controlling mechanisms to prevent the opening of said doors during transport.

32. In a dump vehicle, an underframe, a dump body, said underframe including a center sill having laterally projecting brackets at opposite sides thereof, fulcrum supports for said body carried by said brackets, said fulcrum supports being located at opposite sides of the center line thereof and widely spaced from each other so as to prevent said body from accidentally dumping during transport, said body being selectively rockable on said fulcrum supports for dumping at either side, power lifting mechanisms disposed at opposite sides of the center line of the underframe for rocking said body to dumping position to either side, a door at each side of said body and hinged thereto to fold down for opening, and independent door controlling devices for said door rendered operative by the tilting of the body for automatically, independently and selectively controlling the opening of the door through which dumping is to be effected and for positively closing said door when said body is returned to transport position, said underframe cooperating with said controlling mechanisms to prevent the opening of said doors during transport.

33. In a dump vehicle, an underframe, a dump body, said underframe including a center sill having laterally projecting brackets at opposite sides thereof, fulcrum supports for said body carried by said brackets, said fulcrum supports being located at opposite sides of the center line thereof and widely spaced from each other so as to prevent said body from accidentally dumping during transport, said body being selectively rockable on said fulcrum supports for dumping at either side, power lifting mechanisms disposed at opposite sides of the center line of the underframe for rocking said body to dumping position to either side, a door at each side of said body and hinged thereto to fold down for opening, and independent door controlling devices for said door rendered operative by the tilting of the body for automatically independently and selectively controlling the opening of the door through which dumping is to be effected and for positively closing said door when said body is returned to transport position, said door controlling mechanism operating for maintaining said upper door closed during dumping.

34. In a dump vehicle, an underframe, a dump body, said underframe including a center sill having laterally projecting brackets at opposite sides thereof, fulcrum supports for said body carried by said brackets, said fulcrum supports being located at opposite sides of the center line thereof and widely spaced from each other so as to prevent said body from accidentally dumping during transport, said body being selectively rockable on said fulcrum supports for dumping at either side, power lifting mechanisms disposed at opposite sides of the center line of the underframe for rocking said body to dumping position to either side, a door at each side of said body and hinged thereto to fold down for opening, and independent door controlling devices for said door rendered operative by the tilting of the body for automatically, independently and selectively controlling the opening of the door through which dumping is to be effected and for positively closing said door when said body is returned to transport position, said door controlling mechanism operating for maintaining said upper door closed during dumping, said underframe cooperating with said controlling mechanisms to prevent the opening of said doors during transport.

35. In a dump vehicle, supporting trucks including pairs of wheels, a truck bolster carried thereby, a center sill pivotally connected to said truck bolster, laterally extending underframe bolsters rigidly attached to said center sill and overlying said truck bolsters, fulcrum supports carried by the underframe bolsters and disposed in substantially a vertical plane containing the wheels, a dump body having supporting members adapted to engage said fulcrum supports and rock thereon for dumping at opposite sides of the underframe, said members contacting with said fulcrum supports during transport to prevent accidental dumping, a power mechanism to tilt said dump body, said power mechanism including power lifting devices disposed at opposite sides of the center sill and substantially in the vertical plane of the wheels, and means for checking the tilting movement of the body as it approaches full tilted position.

36. In a dump vehicle, supporting trucks including pairs of wheels, a truck bolster carried thereby, a center sill pivotally connected to said truck bolster, laterally extending body bolsters rigidly attached to said center sill and overlying said truck bolster, fulcrum supports carried by the body bolsters and disposed in substantially a vertical plane containing the wheels, a dump body having supporting members adapted to engage said fulcrum supports and rock thereon for dumping at opposite sides of the underframe, said members contacting with said fulcrum supports during transport to prevent accidental dumping, a power mechanism for tilting said body for dumping, said power mechanism including power lifting devices located at opposite sides of said center sill, means to gradually check the movement of the body at it reaches full tilted position, downfolding doors hinged to the body at each side thereof, and automatic means for controlling the opening and closing of the doors at the dumping side when said body is tilted.

37. In a dump vehicle, an underframe, a dump body, widely spaced fulcrums on the underframe and body disposed substantially at equal distances from a medial longitudinal plane of the vehicle, fluid-operated cylinders pivotally connected to the body and underframe at each side of the vehicle and approximately in a plane through the respective fulcrums, down-folding doors at each side of the body, means for controlling the opening and closing of the doors, and means for creating a fluid pressure in the power cylinders to check the tilting movement of the body and the opening movement of the door.

38. In a dump vehicle, supporting trucks, a longitudinal center sill pivotally mounted on said trucks, a dump body, laterally extending supported members rigidly fixed to said center sill, a power device carried by said members and disposed at one side of said longitudinal center sill, said power devices operating to tilt the body in the opposite direction for dumping, bolster brackets rigidly attached to said center sill supporting fulcrums adjacent one end of said brackets, fulcrum members on said body adapted to engage said supporting fulcrums, said body having bearing support on said underframe opposite the power devices so that when the body is tilted for dumping the torsional strain on the underframe is reduced, a door at one side of said body and hinged thereto to fold down for opening, and door controlling devices for said door for automatically controlling the opening of the door through which dumping is to be effected and for positively closing said door when said body is returned to transport position.

39. The combination of an underframe including a center sill having laterally projecting bolster brackets at opposite sides thereof fixedly connected thereto, fulcrum supports adjacent the outer ends of said bolster brackets, a dump body, fulcrum members carried by said body and engaging the fulcrum supports on the underframe and rockable selectively thereon for dumping at either side, said fulcrum supports being located at opposite sides of the longitudinal center line of the underframe and widely spaced from each other so as to prevent said body from accidental dumping during transport, a door at each side of said body hinged thereto to fold down for opening, and independent devices for controlling the opening and closing of the doors operated by the tilting of the body.

40. In a dump vehicle, supporting trucks including pairs of wheels, a truck bolster carried thereby, a center sill pivotally connected to said truck bolster, laterally extending body bolsters rigidly attached to said center sill and overlying said truck bolster, fulcrum supports carried by the body bolsters and disposed in substantially a vertical plane containing the wheels, a dump body having supporting members adapted to engage said fulcrum supports and rock thereon for dumping at opposite sides of the underframe, said members contacting with said fulcrum supports during transport to prevent accidental dumping, down-folding doors hinged to the body at each side thereof, and independent means for controlling the opening and closing of the doors at the dumping side when the body is tilted.

41. The combination of an underframe including a center sill having laterally projecting bolster brackets at opposite sides thereof fixedly connected thereto, fulcrum supports adjacent the outer ends of said bolster brackets, a dump body, fulcrum members carried by said body and engaging the fulcrum supports on the underframe and rockable selectively thereon for dumping at either side, said fulcrum supports being located at opposite sides of the longitudinal center line of the underframe and widely spaced from each other so as to prevent said body from accidental dumping during transport, supporting members at opposite sides of said center sill fixedly connected thereto, power lifting mechanisms disposed at opposite sides of the center sill mounted on said supporting members and engaging said body for selectively tilting the same, a door at each side of said body hinged thereto to fold down for opening, and devices for controlling the opening and closing of the doors operated by the tilting of the body.

42. The combination of an underframe including a center sill having laterally projecting bolster brackets at opposite sides thereof fixedly connected thereto, fulcrum supports adjacent the outer ends of said bolster brackets, a dump body, fulcrum members carried by said body and engaging the fulcrum supports on the underframe and rockable selectively thereon for dumping at either side, said fulcrum supports being located at opposite sides of the longitudinal center line of the underframe and widely spaced from each other so as to prevent said body from accidental dumping during transport, a door at each side of said body hinged thereto to fold down for opening, devices operating during dumping for holding the door closed at the side which is elevated, and devices operating automatically for controlling the opening of the door through which dumping is to be effected.

HENRY FORT FLOWERS.